United States Patent

Hayashi et al.

[11] Patent Number: 6,138,996
[45] Date of Patent: Oct. 31, 2000

[54] VIBRATION CONTROL DEVICE FOR AUTOMOTIVE PANELS

[75] Inventors: Naoki Hayashi; Yuta Urushiyama, both of Wako, Japan

[73] Assignee: Honda Giken Kogyo Kabushiki Kaisha, Japan

[21] Appl. No.: 09/061,079

[22] Filed: Apr. 15, 1998

[30] Foreign Application Priority Data

Apr. 16, 1997 [JP] Japan .................................. 9-098691
Apr. 16, 1997 [JP] Japan .................................. 9-098702

[51] Int. Cl.⁷ ...................................................... F16M 1/00
[52] U.S. Cl. .............................................................. 267/136
[58] Field of Search ................................ 188/266, 266.7, 188/378; 267/136; 280/124.108

[56] References Cited

U.S. PATENT DOCUMENTS 5,458,222 10/1995 Pla et al. .................................. 188/136
5,594,168 1/1997 Terajima .................................. 73/496

*Primary Examiner*—Robert J. Oberleitner
*Assistant Examiner*—Devon Kramer
*Attorney, Agent, or Firm*—Skjerven Morrill MacPherson LLP

[57] ABSTRACT

The vibration control device comprises an electromechanical transducer module adapted to be attached to an outer surface of a panel member, and a control circuit for electrically controlling an internal stress of the electromechanical transducer module so that the internal stress counteracts a stress of the panel member resulting from a vibration of the panel member that is desired to be controlled. Thus, the stress produced from the vibration of the panel member is transmitted to the electromechanical transducer module, and is converted into an electric energy. The electric energy thus produced by the vibration of the panel member is applied to the electromechanical transducer module, and is thereby converted into an internal stress of the electromechanical transducer module which counteracts the vibration of the panel member. Therefore, the rigidity of the panel member against vibration can be increased in effect, and, in particular, the resonant vibration of the panel member can be effectively controlled as well as other vibrations of the panel member arising from various sources.

16 Claims, 7 Drawing Sheets

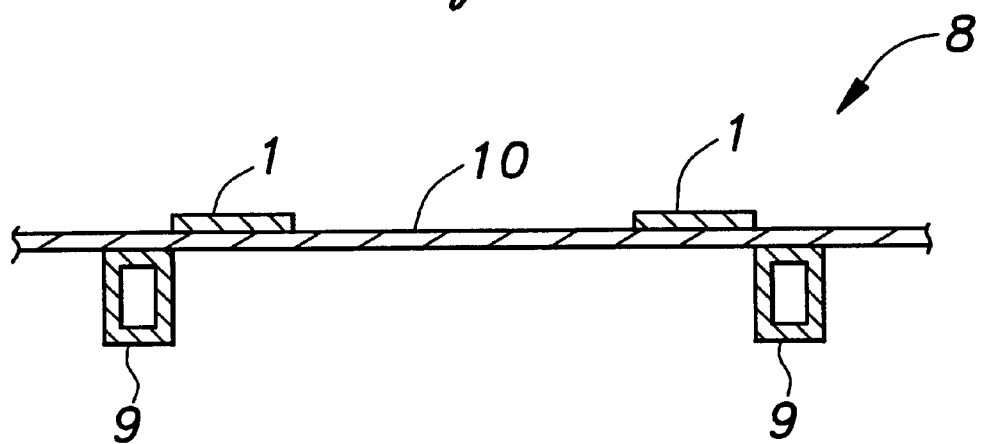
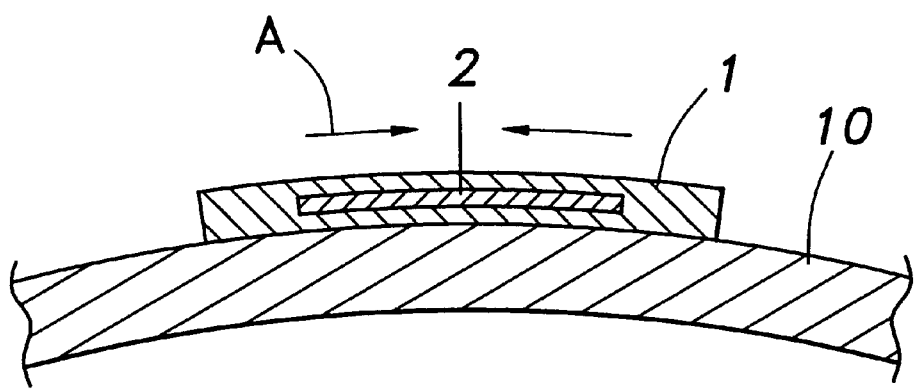

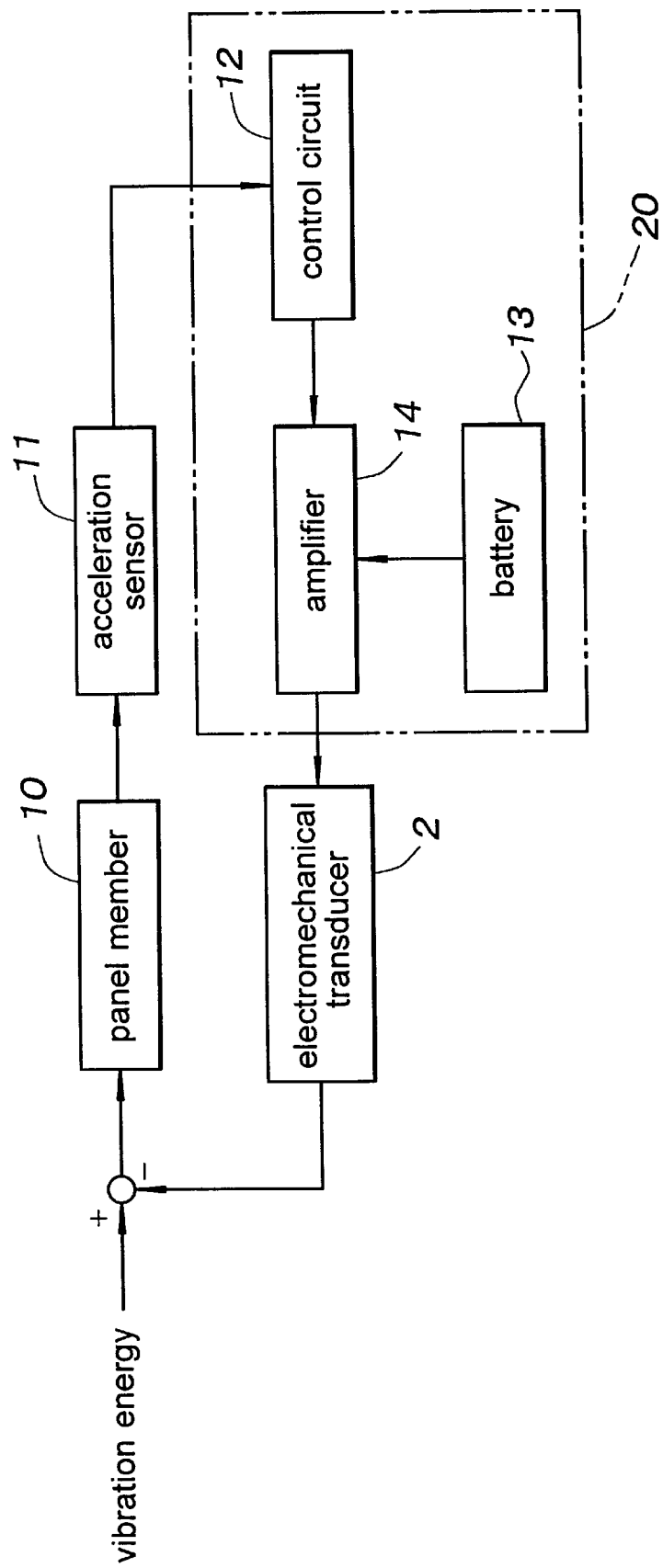

VIBRATION CONTROL DEVICE FOR AUTOMOTIVE PANELS

TECHNICAL FIELD

The present invention relates to a vibration control device which is suitable for controlling the vibrations of automotive panels.

BACKGROUND OF THE INVENTION

To achieve a low acoustic noise level in motor vehicles, it is known to be beneficial to reduce the vibrations of the panels separating an engine room from a passenger compartment such as a dashboard, and to prevent the transmission of vibrations through the panels. For instance, the rigidity of the panel may be increased by increasing the thickness of the panel, and providing ribs and beads in the panel. To add a damping property to the panel, an asphalt sheet may be thermally bonded to the panel, or viscoelastic material may be sprayed over the panel. This is known to be effective in reducing the vibration transmissivity of the panel.

However, these measures inevitably increase the weight of the vehicle body, and the resulting increase in the thickness of the panel reduces the space available for the passenger compartment. The resulting increase in the mass of the panel lowers the resonance frequency of the panel so that the insulation of low frequency noises may not be achieved in a satisfactory manner.

BRIEF SUMMARY OF THE INVENTION

In view of such problems of the prior art, a primary object of the present invention is to provide a vibration control device for automotive panels which is effective in controlling the vibration of automotive panels substantially without increasing the mass of the panels.

A second object of the present invention is to provide a vibration control device for automotive panels which is effective in controlling the vibration of automotive panels substantially without taking up any space.

A third object of the present invention is to provide a vibration control device for automotive panels which is effective in controlling the vibration of automotive panels over a wide frequency range.

According to the present invention, these and other objects can be accomplished by providing a vibration control device for panel members, comprising: an electromechanical transducer module adapted to be attached to a surface of a panel member; and a control circuit for electrically controlling an internal stress of the electromechanical transducer module so that the internal stress counteracts a stress of the panel member resulting from a vibration of the panel member that is desired to be controlled.

Thus, the effective rigidity of the panel member can be increased so that both the vibrations of the panel and the transmission of vibrations can be favorably controlled. The electromechanical transducer module which serves as the actuator for controlling the stress of the panel can be constructed as a highly compact sheet member so that the installation of the vibration control device adds very little to the weight and the thickness of the panel member. Typically, the electromechanical transducer module comprises a piezoelectric transducer. Because it is highly essential to control the resonant vibration of the panel member, the control circuit may comprise an analog resonance circuit tuned to a resonance frequency of the panel member which is desired to be controlled. For compact design of the electromechanical transducer module, the analog resonance circuit may be integrally incorporated in the electromechanical transducer module.

According to a preferred embodiment of the present invention, the electromechanical transducer module comprises a planar piezoelectric transducer element, a pair of layers of electrodes interposing the piezoelectric transducer element therebetween, a planar analog resonance circuit disposed adjacent to the piezoelectric transducer element, and a package encapsulating the piezoelectric transducer element, the electrodes, and the analog resonance circuit integrally therein. Therefore, the device can be used as a self-sufficient device which can be freely applied to desired places, and is protected from elements so as to be safely used in various harsh environments such as the underside of motor vehicles over extended periods of time.

If a large amount of electric energy is required to control the vibration of the panel member, the control circuit may comprise an amplifier which is powered by a power source to apply external electric energy to the electromechanical transducer module. The control circuit in this case can also be constructed as a thin planar element which can be encapsulated in a thin sheet-like package along with the piezoelectric transducer element and the electrodes. The data for the control circuit may be obtained either from a separate acceleration sensor attached to the panel member or from the electromechanical transducer module itself.

To effectively control a vibration of a panel member, the electromechanical transducer module may be attached to a part of the panel member adjacent to a relatively rigid part thereof. In particular, the electromechanical transducer module may be attached to each side of the panel member for most effectively controlling the bending vibrations of a panel member.

The electromechanical transducer module typically consists of a piezoelectric element such as PZT (piezoelectric lead zirconate titanate), PLZT (piezoelectric lead lanthanum zirconate titanate), PMN (piezoelectric lead magnesium niobate) and PVDF (piezoelectric polyvinylidene fluoride).

BRIEF DESCRIPTION OF THE DRAWINGS

Now the present invention is described in the following with reference to the appended drawings, in which:

FIG. 5 is a sectional view showing an exemplary panel assembly to which the present invention is applied;

FIG. 6 is a schematic sectional view illustrating the operation of the electromechanical transducer module in controlling the bending vibration of a panel member;

FIG. 7 is a block diagram of a control arrangement including a control circuit which is constructed as an active circuit capable of applying external electric energy to the electromechanical transducer module;

DETAILED DESCRIPTION OF THE PREFERRED EMBODIMENTS

Figure 1:
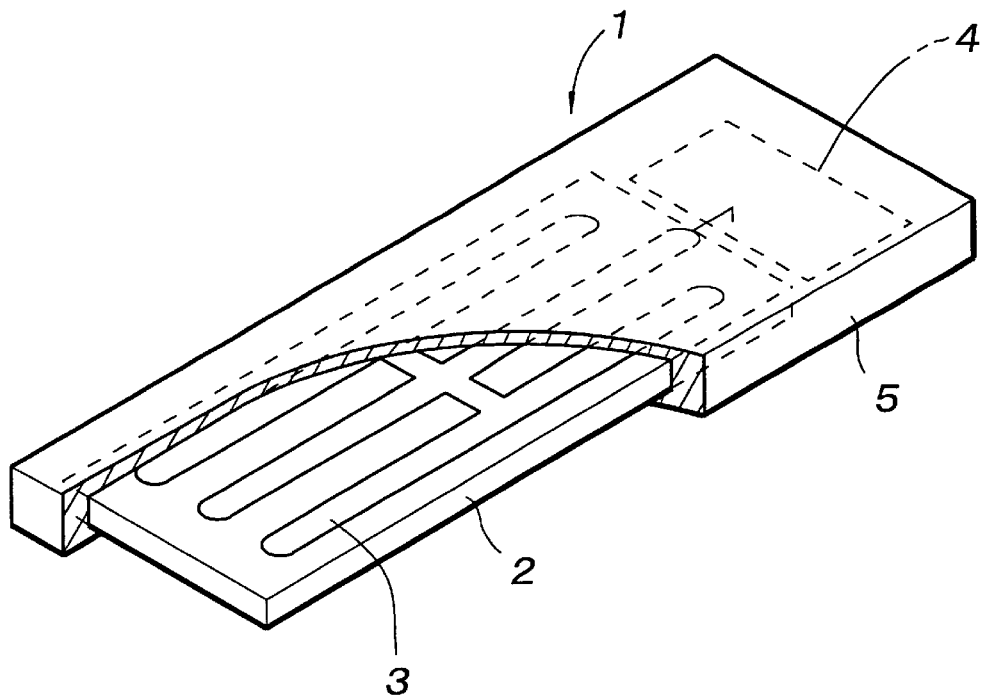
FIG. 1 is a partly broken away perspective view showing a electromechanical transducer module embodying the present invention.
Figure 2:
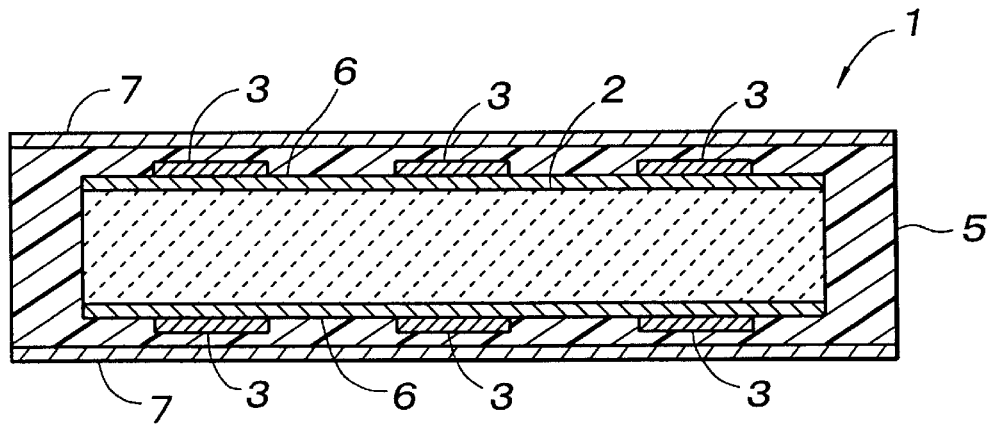
FIG. 2 is a sectional view of the electromechanical transducer module of FIG. 1.

FIG. 1 illustrates an electromechanical transducer module 1 embodying the present invention. This electromechanical transducer module 1 is adapted to produce an electric voltage according to the stress applied thereto, and to produce a stress according to the electric voltage applied thereto. Referring to FIG. 2, the electromechanical transducer module 1 comprises a piezoelectric transducer element 2 consisting of PZT or the like formed as a rectangular plate, a pair of copper electrodes 3 placed over the front and reverse surface of the piezoelectric transducer element 2, a control circuit 4 electrically connected to the copper electrodes 3, and an epoxy package 5 encapsulating the piezoelectric transducer element 2, the copper electrodes 3, and the control circuit 4 therein through a thermal curing process. An electroconductive sheet 6 containing Ni is interposed between the piezoelectric transducer element 2 and each of the copper electrodes 3, and the two sides of the epoxy package 5 are covered by polyimide film 7.

Figure 3:
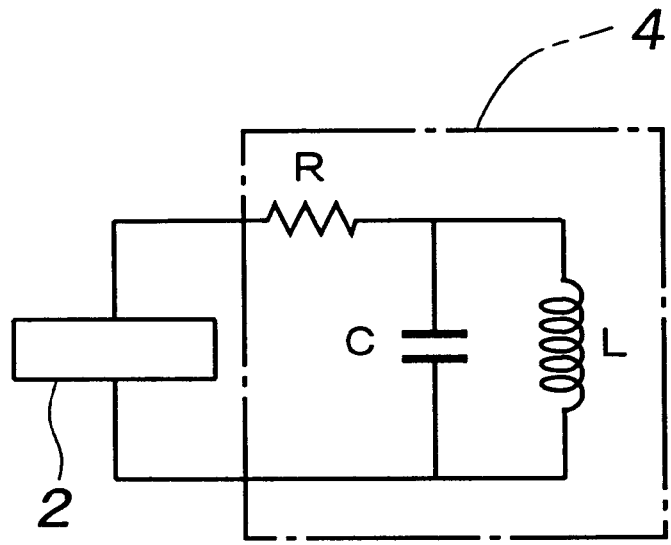
FIG. 3 is a circuit diagram of a resonance circuit which may be used as the control circuit incorporated in the electromechanical transducer module of FIG. 1.
Figure 4:
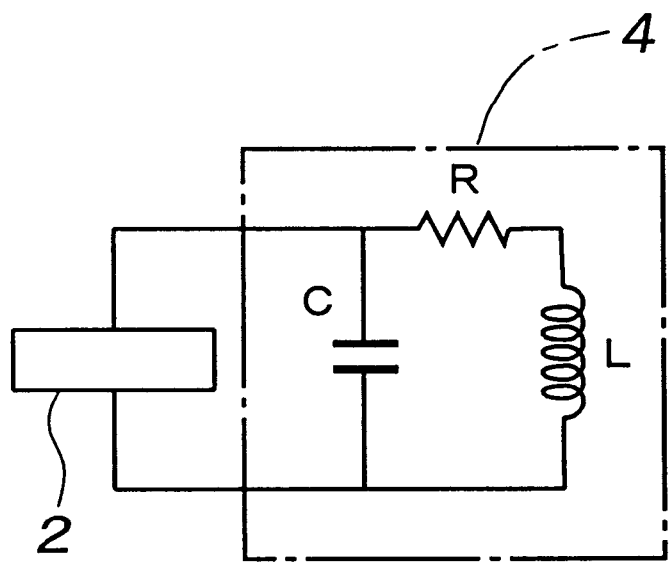
FIG. 4 is a circuit of another resonance circuit which may be used as the control circuit incorporated in the electromechanical transducer module of FIG. 1.

The control circuit 4 essentially consists of an analog resonance circuit which is tuned to the resonance frequency of the bending vibration of the automotive panel to be controlled as described hereinafter. This circuit may be formed by connecting a capacitor C and a coil L in parallel, and connecting a resistor R in series with this parallel circuit as illustrated in FIG. 3. Alternatively, the circuit may be formed by connecting a coil L and resistor R in series, and connecting a capacitor C in parallel with the series circuit as illustrated in FIG. 4.

FIG. 5 schematically illustrates an automotive panel assembly to which the present invention is applied. This panel assembly 8 comprises a pair of frame members 9 each having a rectangular and hollow cross section, and a panel member 10 integrally attached to the frame members 9 by spot welding. A plurality of electromechanical transducer modules 1 are attached to the parts of the panel member 10 adjacent to the frame members 9. The electromechanical transducer modules 1 are arranged along the length of each of the frame members 9.

Now the mode of operation of this arrangement is described in the following. When the panel assembly 8 undergoes a bending vibration, a cyclic stress is produced in the piezoelectric transducer element 2 of each electromechanical transducer module 1 as a result of bending stress produced in the panel member 10. As well known in the art, this stress alternates between compression and tension at the frequency of the bending vibration of the panel assembly 8. This in turn causes a cyclic voltage to be supplied from the piezoelectric transducer element 2 to the control circuit 4. Therefore, when the panel assembly 8 vibrates at its resonance frequency, the control circuit 4 produces electric energy having such a voltage, frequency and phase relationship as to produce a stress which counteracts the bending vibration of the panel assembly 8.

For instance, when the panel member 10 has deflected to the position illustrated in FIG. 6 during a resonant vibration of the panel assembly 8, the piezoelectric transducer element 2 of the electromechanical transducer module 1 which is placed under tension produces a compressive stress as indicated by the arrows. Conversely, when the panel member 10 has deflected in the opposite direction, the electromechanical transducer module 1 produce stress in the opposite direction. In other words, the internal stresses which are produced in the piezoelectric transducer elements 2 oppose the deformation of the panel member 10, and this increases the bending rigidity of the panel member 10 or the panel assembly 8 in effect.

The control circuit 4 for the above described embodiment consisted of a passive analog circuit, but it is also possible to use active circuits for more positive control of the vibrations of various members. In the embodiment illustrated in FIG. 7, an acceleration sensor 11 which may consist of a piezoelectric transducer element is attached to a panel member in addition to a electromechanical transducer module 1 similar to that of the previously described embodiment. The output from this acceleration sensor 11 is processed as a data signal by a control unit 20 which includes a control circuit 12 for obtaining the amplitude and frequency of the vibration of the panel member, and a battery 13 and an amplifier 14 which, under control from the control circuit 12, produces electric energy having such a voltage, frequency and phase relationship which counteract and cancel the existing vibration of the panel member, according to the data signal obtained from the acceleration sensor 11. According to this arrangement, the frequency of the voltage applied to the piezoelectric transducer element 2 of the electromechanical transducer module 1 can be selected at will depending on the frequency and amplitude of the vibration of the panel member so that a wider range of vibrations of the panel member can be controlled. For instance, this arrangement may be applied to the prevention of transmission of low frequency vibrations over the panel member which has been known to be highly difficult to control with conventional methods. Also, by increasing the electric energy for actuating the electromechanical transducer module 1, it becomes possible to control more powerful vibrations in a more positive way.

If desired, the acceleration sensor 11 may be omitted because the piezoelectric transducer element 2 of the electromechanical transducer module 1 can itself detect stress. In this case, the control unit 20 controls the electric voltage applied to the electromechanical transducer module 1 so as to cancel the voltage output from the electromechanical transducer module 1.

Figure 8:
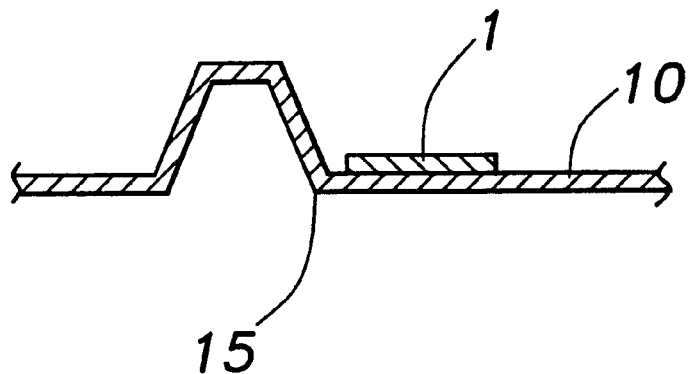
FIG. 8 is a sectional view showing another exemplary panel assembly to which the present invention is applied.
Figure 9:
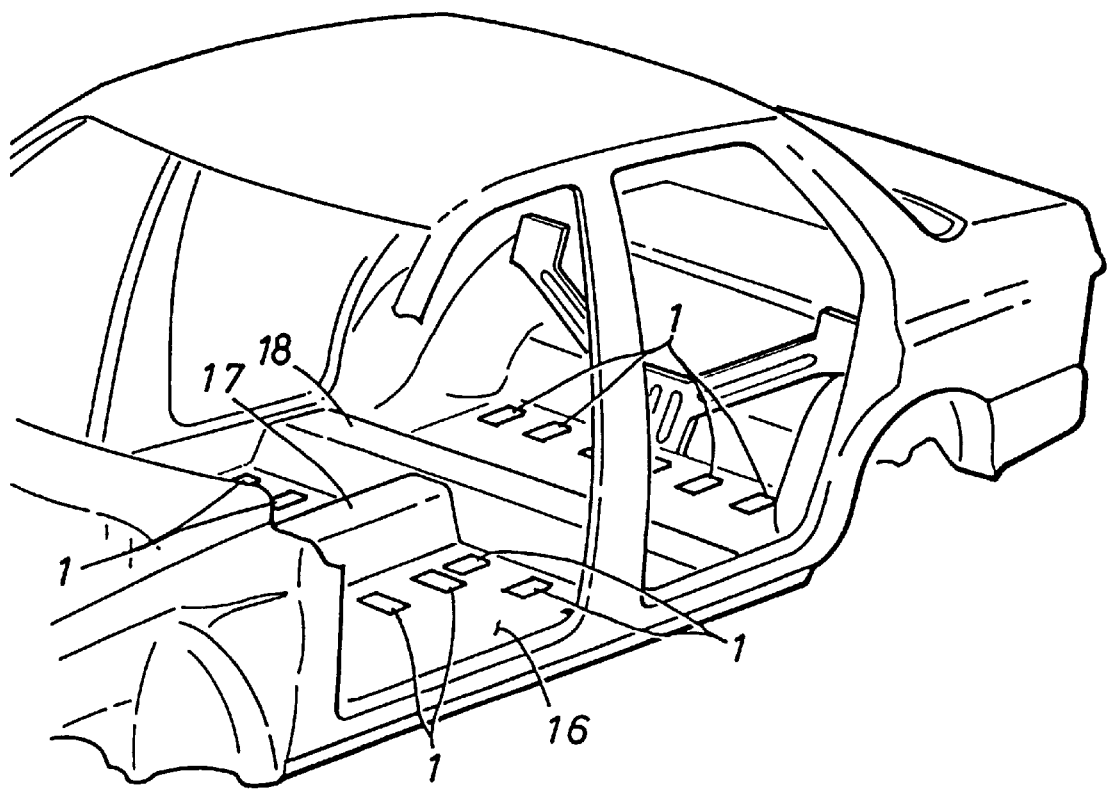
FIG. 9 is a perspective view of a vehicle body showing various locations where the electromechanical transducer modules of the present invention may be applied.

The electromechanical transducer module 1 can be attached to almost any desired locations of a member which is to be controlled. For instance, as illustrated in FIG. 8, a plurality of electromechanical transducer modules 1 can be attached to a part of a panel member 10 extending along a bent line 15 of the panel member 10. FIG. 9 also illustrates various locations of an automotive vehicle body at which the electromechanical transducer modules 1 of the present invention can be attached. For instance, a plurality of electromechanical transducer modules 1 can be attached to a part of a floor panel 16 extending along a center tunnel 18, or a cross member 18. Particularly preferred locations for attaching the electromechanical transducer modules 1 include parts of panel members adjoining beam members.

Figure 10:
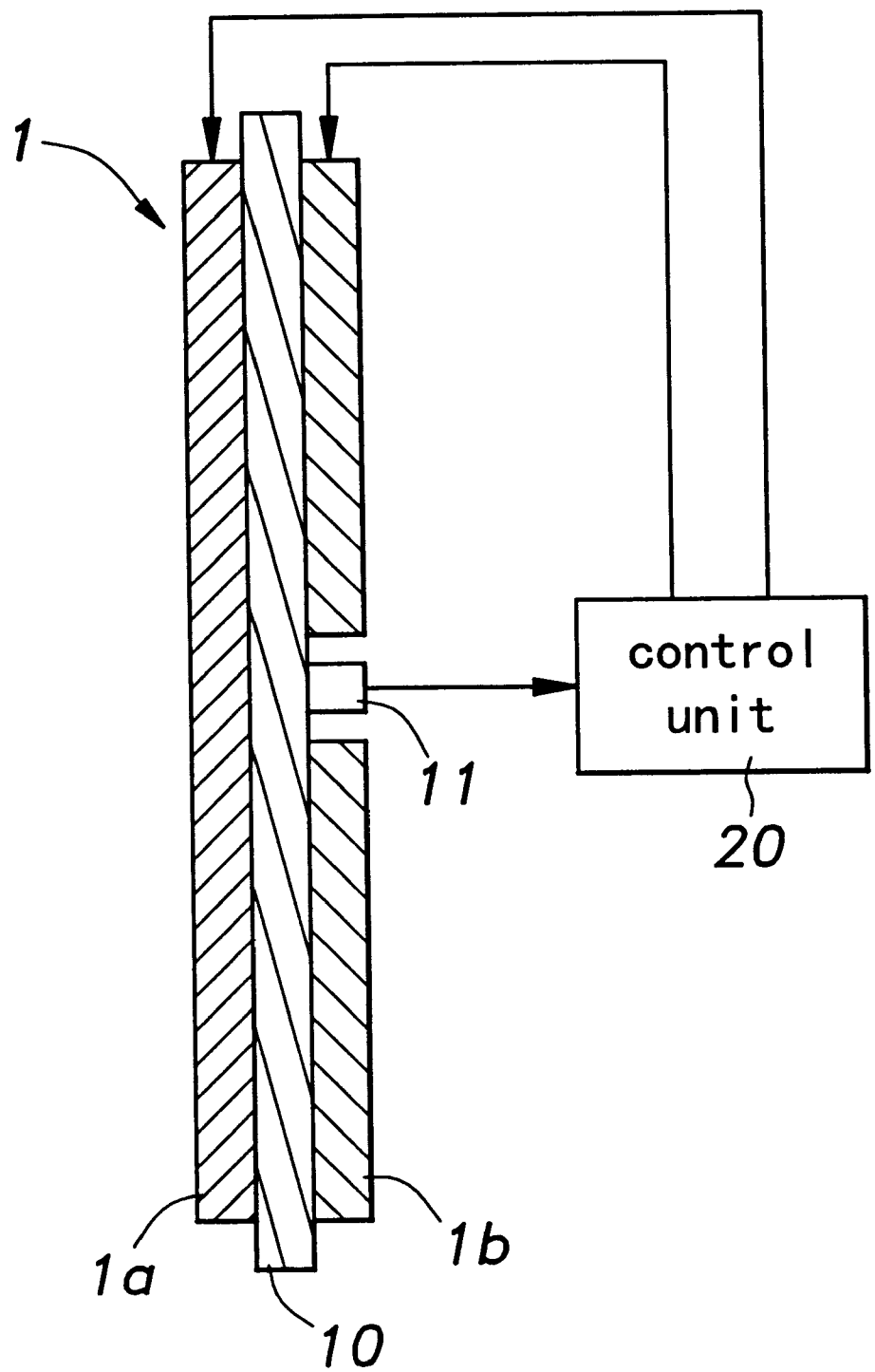
FIG. 10 is a schematic diagram showing an arrangement for controlling the vibrations of a panel member from two sides thereof.

To achieve a particularly powerful vibration control, electromechanical transducer modules 1 can be attached to two sides of a panel member. Referring to FIG. 10, an acceleration sensor 11 is attached to a central part of a panel member 10 which is desired to be controlled, and a pair of electromechanical transducer modules 1*a* and 1*b* are attached to the two sides of the panel member 10. The acceleration sensor 11 and the electromechanical transducer modules 1*a* and 1*b* are connected to a control unit 20.

A vibration of the panel member 10 is detected by the acceleration sensor 11, and the output from the acceleration sensor 11 is processed by the control unit 20 to determine the amplitude, frequency and phase relationship of the vibration. Based on this data, the control unit 20 applies a voltage to the electromechanical transducer modules 1*a* and 1*b* to produce stresses in the electromechanical transducer modules 1*a* and 1*b* so as to cancel the vibration of the panel member 10.

Figure 11:
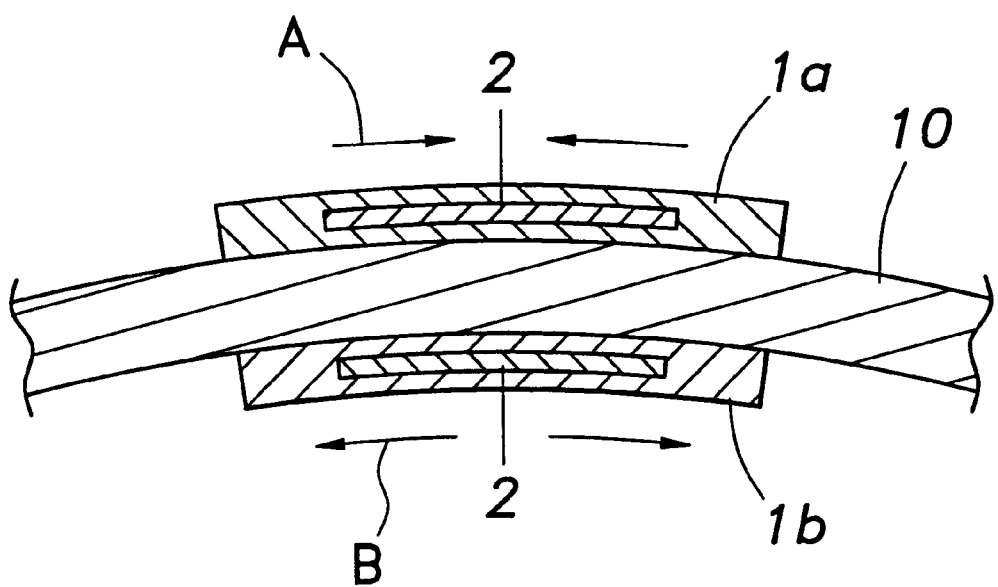
FIG. 11 is a schematic sectional view illustrating the operation of the electromechanical transducer modules in controlling the bending vibration of a panel member from two sides thereof.

When the panel member 10 has deflected in one direction as illustrated in FIG. 11, a compressive stress is produced by the control unit 20, as indicated by the arrows A, in the electromechanical transducer module 1*a* which is attached to a part of the panel member 10 under tension, and a tensile stress is produced by the control unit 20, as indicated by the arrows B, in the electromechanical transducer module 1*b* which is attached to a part of the panel member 10 under compression. When the panel member 10 has deflected in the opposite direction, opposite stresses are produced in the corresponding electromechanical transducer modules 1*a* and 1*b*. Thus, the two electromechanical transducer modules 1*a* and 1*b* jointly counteract the stresses of the panel member 10 so as to reduce the deflection of the panel member 10. By adjusting the amplitude, frequency and phase relationship of the voltage applied to the electromechanical transducer modules 1*a* and 1*b*, it becomes possible to control the vibrations of the panel member 10 over a wide frequency range.

A panel member is known to demonstrate various resonant vibration modes, in particular when the thickness of the panel member is reduced. According to the present invention, the rigidity of the panel member can be increased in effect. Therefore, even when the thickness of the panel member is reduced, the panel member can have a relatively high rigidity so that the vibration of the panel member can be controlled as desired. Because the electromechanical transducer modules 1*a* and 1*b* can be constructed as patches having a small thickness, the mass or the thickness of the panel member would not be significantly increased.

Although the present invention has been described in terms of preferred embodiments thereof, it is obvious to a person skilled in the art that various alterations and modifications are possible without departing from the scope of the present invention which is set forth in the appended claims.

What we claim is:

1. A vibration control device for panel members, comprising:

an electromechanical transducer module adapted to be attached to a surface of a panel member, said electromechanical transducer module comprising:
    a planar piezoelectric transducer element; and
    a pair of electrode layers interposing said piezoelectric transducer element therebetween;
    a control circuit for electrically controlling an internal stress of said electromechanical transducer module so that said internal stress counteracts a stress of the panel member resulting from a vibration of the panel member that is desired to be controlled, said control circuit comprising an amplifier which is powered by a power source to apply external electric energy to said electromechanical transducer module, said control circuit being disposed adjacent to said piezoelectric transducer element; and
    a package encapsulating said piezoelectric transducer element, said pair of electrode layers, and said control circuit integrally therein.

2. A vibration control device for panel members according to claim 1, further comprising an acceleration sensor attached to said panel member to supply a data signal to said control circuit for controlling the vibration of said panel member.

3. A vibration control device for panel members according to claim 1, wherein said control circuit receives a data signal for controlling the vibration of said panel member from said electromechanical transducer module.

4. A vibration control device for panel members according to claim 1, wherein said electromechanical transducer module is adapted to be attached to a part of said panel member adjacent to a relatively rigid part thereof.

5. A vibration control device for panel members according to claim 1, wherein said electromechanical transducer module is attached to each side of said panel member.

6. A vibration control device for panel members, comprising:

an electromechanical transducer module adapted to be attached to a surface of a panel member; and
    a control circuit including an analog resonance circuit tuned to a resonance frequency of the panel member which is desired to be controlled for electrically controlling an internal stress of said electromechanical transducer module so that said internal stress counteracts a stress of the panel member resulting from a vibration of the panel member;
    wherein said analog resonance circuit is integrally incorporated in said electromechanical transducer module.

7. A vibration control device for panel members according to claim 6, wherein said electromechanical transducer module comprises a piezoelectric transducer element.

8. A vibration control device for panel members according to claim 6, wherein said electromechanical transducer module comprises a planar piezoelectric transducer element, a pair of layers of electrodes interposing said piezoelectric transducer element therebetween, a planar analog resonance circuit disposed adjacent to said piezoelectric transducer element, and a package encapsulating said piezoelectric transducer element, said electrodes, and said analog resonance circuit integrally therein.

9. A vibration control device for panel members according to claim 6, wherein said electromechanical transducer module is attached to each side of said panel member.

10. A vibration control device for panel members according to claim 6, wherein said electromechanical transducer module comprises a piezoelectric transducer element.

11. A vibration control device for panel members according to claim 6, wherein said control circuit receives a data signal for controlling the vibration of said panel member from said electromechanical transducer module.

12. A vibration control device for panel members, comprising:

an electromechanical transducer module adapted to be attached to a surface of a panel member;
    a control circuit for electrically controlling an internal stress of said electromechanical transducer module so that said internal stress counteracts a stress of the panel member resulting from a vibration of the panel member that is desired to be controlled, said control circuit comprising an amplifier which is powered by a power source to apply external electric energy to said electromechanical transducer module;

wherein said control circuit receives a data signal for controlling the vibration of said panel member from said electromechanical transducer module, and said electromechanical transducer module comprises a planar piezoelectric transducer element, a pair of layers of electrodes interposing said piezoelectric transducer element therebetween, said control circuit disposed adjacent to said piezoelectric transducer element, and a package encapsulating said piezoelectric transducer element, said electrodes, and said control circuit integrally therein.

13. A vibration control device for panel members according to claim 12, further comprising an acceleration sensor attached to said panel member to supply a data signal to said control circuit for controlling the vibration of said panel member.

14. A vibration control device for panel members according to claim 12, wherein said electromechanical transducer module is adapted to be attached to a part of said panel member adjacent to a relatively rigid part thereof.

15. A vibration control device for panel members according to claim 12, wherein said electromechanical transducer module is attached to each side of said panel member.

16. A vibration control device for panel members according to claim 12, wherein said electromechanical transducer module comprises a piezoelectric transducer element.

* * * * *